(12) United States Patent
Wu

(10) Patent No.: US 9,438,083 B2
(45) Date of Patent: Sep. 6, 2016

(54) MOTOR HAVING A BRAKING FUNCTION AND USED IN LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/973,257

(22) Filed: Dec. 17, 2015

(65) Prior Publication Data

US 2016/0105075 A1 Apr. 14, 2016

Related U.S. Application Data

(62) Division of application No. 13/429,378, filed on Mar. 25, 2012, now Pat. No. 9,369,026.

(30) Foreign Application Priority Data

Dec. 30, 2011 (TW) .............................. 100150024 A

(51) Int. Cl.

| H02K 7/102 | (2006.01) |
| H02K 7/116 | (2006.01) |
| F16D 49/02 | (2006.01) |
| F16H 25/24 | (2006.01) |
| H02K 7/14 | (2006.01) |
| A61G 7/018 | (2006.01) |
| F16H 25/20 | (2006.01) |

(52) U.S. Cl.
CPC .............. *H02K 7/102* (2013.01); *F16D 49/02* (2013.01); *F16H 25/2454* (2013.01); *H02K 7/116* (2013.01); *H02K 7/1166* (2013.01); *A61G 7/018* (2013.01); *F16H 2025/209* (2013.01); *H02K 7/14* (2013.01)

(58) Field of Classification Search
CPC .... H02K 7/102; H02K 7/1166; H02K 7/116; F16D 49/02; F16H 25/2454
USPC ......................................... 310/76, 77, 92, 93
See application file for complete search history.

(56) References Cited

U.S. PATENT DOCUMENTS

| 2007/0138884 A1* | 6/2007 | McMillan | .............. H02K 7/102 310/77 |
| 2012/0305346 A1* | 12/2012 | Wu | ...................... H02K 7/1166 188/134 |

FOREIGN PATENT DOCUMENTS

| DE | 102005063000 A1 | 7/2007 |
| DE | 102011055510 A1 | 12/2012 |

OTHER PUBLICATIONS

Notice of Oral Examination dated May 13, 2016 of parent patent's corresponding German patent application.

*Primary Examiner* — Naishadh Desai
(74) *Attorney, Agent, or Firm* — Chun-Ming Shih; HDLS IPR Services

(57) ABSTRACT

A motor, which has a braking function and is used in a linear actuator includes a main body, a rotation shaft, a braking means and a stopping means. The rotation shaft penetrates the center of the main body. The braking means includes a braking ring and a helical ring. The braking ring includes a plurality of curved plates. The helical ring surrounds outer edges of the curved plates. Each curved plate is put on the outer periphery of the rotation shaft. The stopping means is disposed between the main body and the braking means for restricting the rotation of any of the curved plates. By this arrangement, a better braking and decelerating function can be achieved.

4 Claims, 17 Drawing Sheets

MOTOR HAVING A BRAKING FUNCTION AND USED IN LINEAR ACTUATOR

CROSS-REFERENCE TO RELATED APPLICATION

This application is a divisional application of U.S. patent application Ser. No. 13/429,378, filed on Mar. 25, 2012, and entitled "MOTOR HAVING A BRAKING FUNCTION AND USED IN LINEAR ACTUATOR". The entire disclosures of the above application are all incorporated herein by reference.

BACKGROUND OF THE INVENTION

1. Field of the Invention

The present invention relates to a motor used in a linear actuator, and in particular to a motor having a braking function and used in a linear actuator.

2. Description of Prior Art

Linear actuator employs a motor, a worm rod, a worm wheel and other driving elements to drive a lead screw to rotate. The lead screw drives a telescope tube threadedly connected onto the lead screw to generate a linear extending action or retracting action. Since the structure and installation of the linear actuator are easier and more convenient than those of a pneumatic cylinder or a hydraulic cylinder, the linear actuator has been widely used in a sickbed, electric chair or other places where extending and retracting actions are needed.

EP0662573B1 and WO2004-027290A2 disclose a linear actuator respectively. The linear actuator disclosed in EP0662573B1 includes a worm rod, a lead screw, a worm wheel set fixed to one end of the lead screw. The worm wheel set comprises a worm wheel. A helical spring surrounds the outer periphery of a cylindrical ring. In this way, the linear actuator can be obtained. In view of the problems of the EP0662573B1, the linear actuator disclosed in WO2004-027290A2 is provided with a heat-conducting element for dissipating the heat generated by the frictional force between the helical spring and the cylindrical ring.

However, in the conventional linear actuator, the helical spring is stationary, but the cylindrical ring is rotatable together with the worm wheel. Thus, heat is generated due to the friction force between the helical spring and the cylindrical ring. The cylindrical ring is made of plastic materials. The heat generated by the frictional force makes the temperature of the cylindrical ring to increase and even melt. Or, the helical spring may be worn quickly to reduce its lifetime. Only a line contact is formed between the helical spring and the cylindrical ring to generate a decelerating effect or braking effect. Thus, the contact area between the helical spring and the cylindrical ring is not large enough to generate a sufficient decelerating effect or braking effect.

SUMMARY OF THE INVENTION

The present invention is to provide a motor having a braking function and used in a linear actuator, in which a stopping means is provided to prevent the rotation of a braking ring. The helical ring constricts the braking ring to brake a rotation shaft. In this way, a good braking and decelerating effect can be achieved.

The present invention provides a motor having a braking function and used in a linear actuator, including a main body, a rotation shaft, a braking means and a stopping means. The rotation shaft penetrates the center of the main body. The braking means comprises a braking ring and a helical ring. The braking ring is constituted of a plurality of curved plates. The helical ring surrounds the outer edge of each curved plate. Each curved plate is put on the outer periphery of the rotation shaft. The stopping means is disposed between the main body and the braking means for restricting the rotation of any of the curved plates.

The present invention provides a motor having a braking function and used in a linear actuator, including a main body, a rotation shaft, a braking means and a stopping means. The rotation shaft penetrates the center of the main body. The braking means comprises a braking ring and a helical ring. The braking ring is provided with a groove. The helical ring surrounds the outer periphery of the braking ring. The braking ring is put on the outer periphery of the rotation shaft. The stopping means is disposed between the main body and the braking means for restricting the rotation of the braking ring.

The present invention has advantageous features as follows. Since the wear of the helical spring is small, its lifetime is extended. The contact area between the braking ring and the rotation shaft is large enough to generate a better braking and decelerating effect. The braking means and the stopping means are disposed on the rotation shaft of the linear actuator, so that only a small force is needed to generate a better braking effect. When the telescopic tube retracts, a braking and decelerating effect is obtained. Thus, the telescopic tube can be kept at a stable rate to lower or retract into an outer tube, thereby making a user to feel more comfortable.

Further, the present invention has other advantages of simple structure, low cost, and small volume. With the rectangular structure of the braking ring and/or one end of the helical spring being fixed, the braking ring and the helical spring will not rotate relative to each other, so that each curved plate can generate a better braking effect to the rotation shaft.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
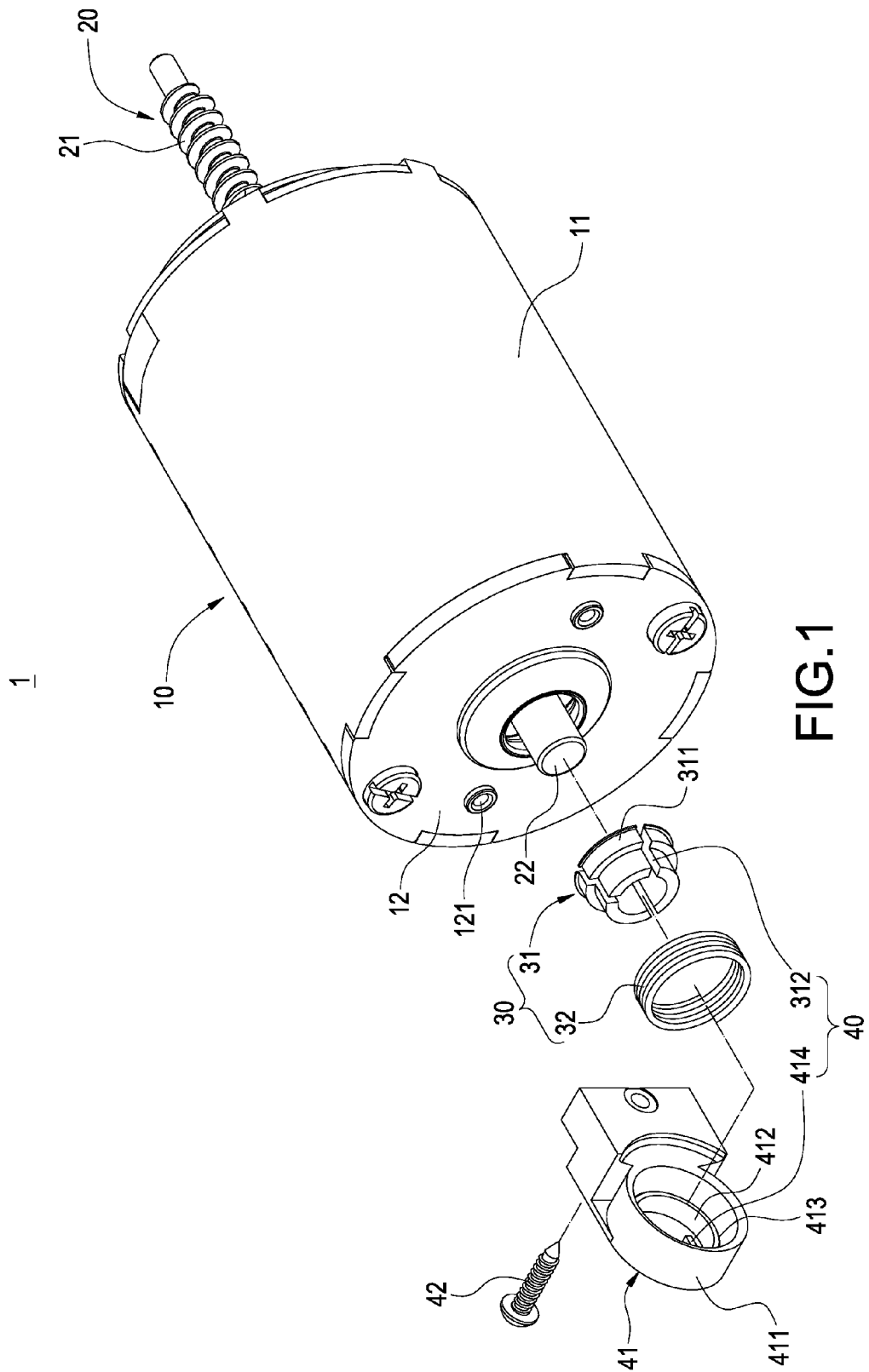
FIG. 1 is an exploded perspective view showing a first embodiment of the present invention.
Figure 2:
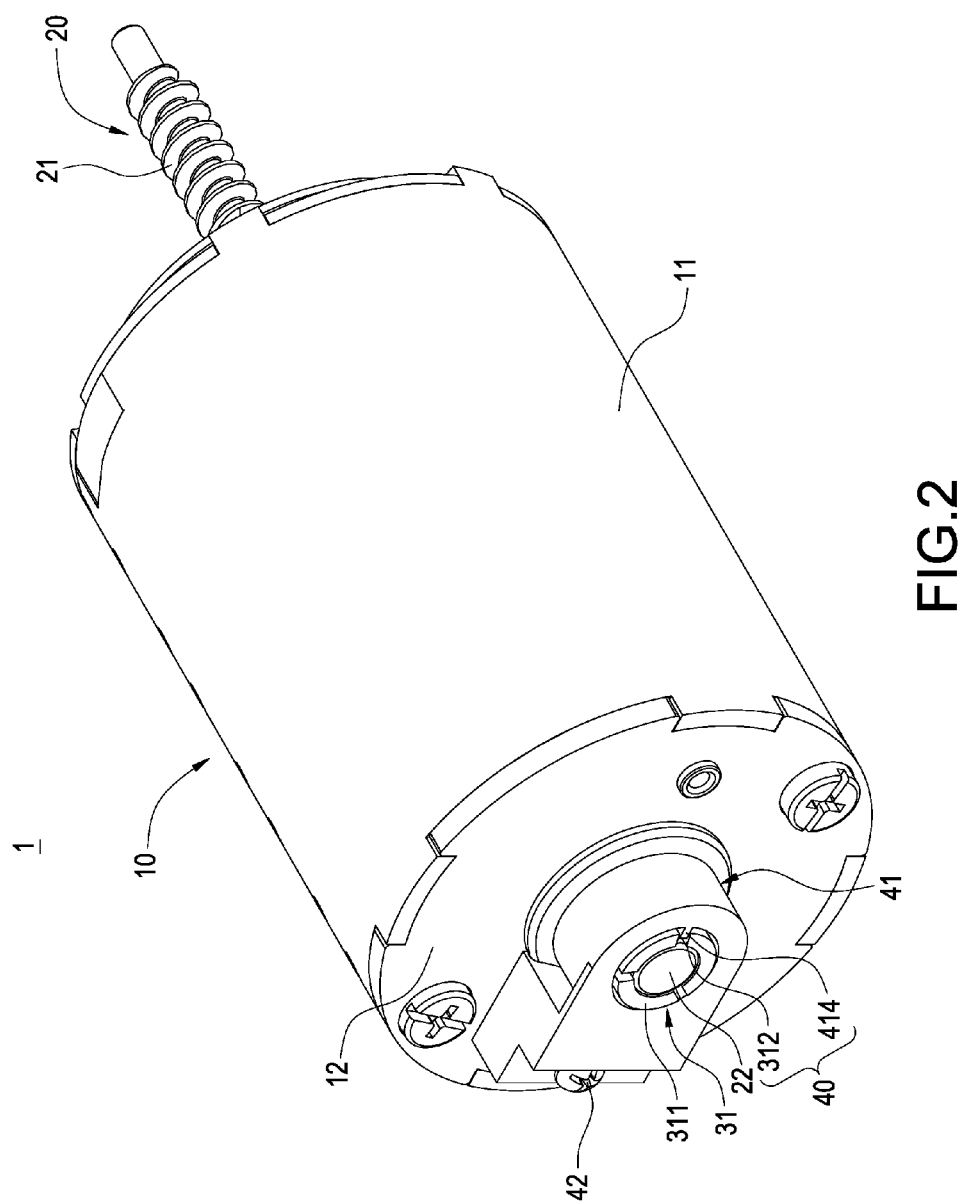
FIG. 2 is an assembled view showing the external appearance of the first embodiment of the present invention.
Figure 3:
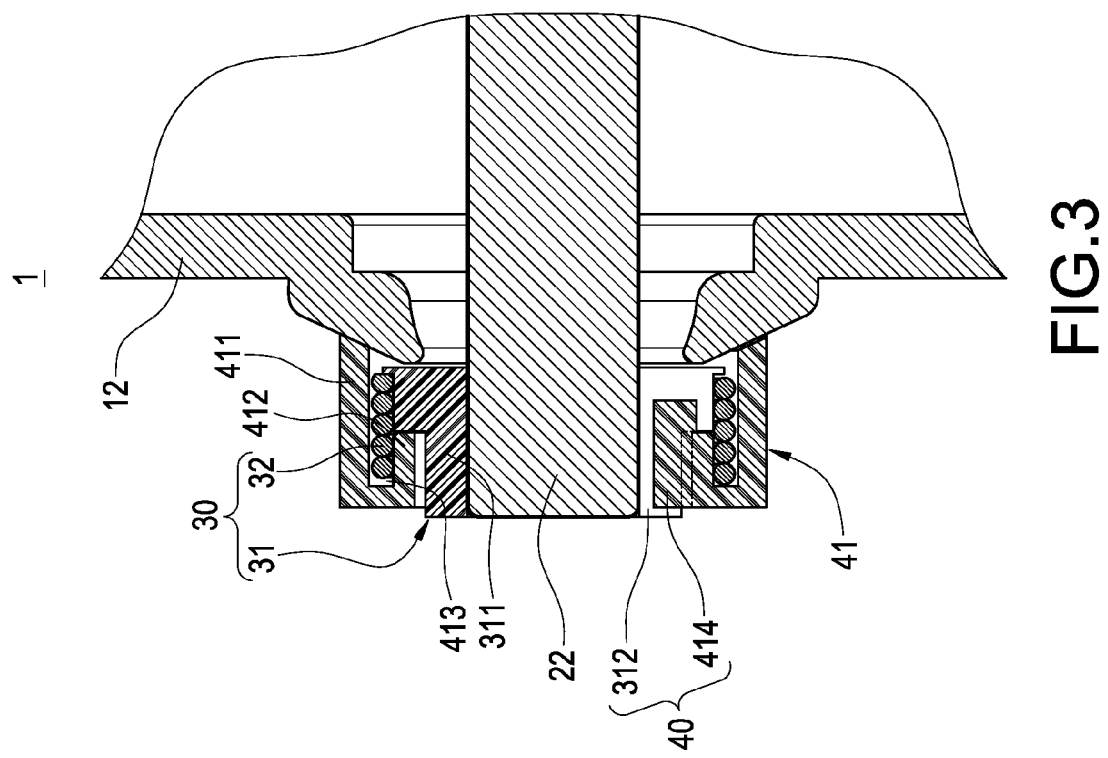
FIG. 3 is a partially cross-sectional view of FIG. 2.

Please refer to FIGS. 1 to 3. The present invention provides a motor having a braking function and used in a linear actuator. The motor 1 includes a main body 10, a rotation shaft 20, a braking means 30, and a stopping means 40.

The main body 10 has a cylindrical casing 11. The interior of the casing 11 is provided with a stator, a rotor, a winding or the like (not shown). An end surface of the casing 11 is provided with an end cover 12. The end cover 12 is provided with a plurality of threaded holes 121.

The rotation shaft 20 penetrates the center of the main body 10. Both ends of the rotation shaft 20 extend outwardly to be exposed to the outside of the casing 11 and the end cover 12. One end of the rotation shaft 20 has a worm rod 21, and the other end of the rotation shaft 20 near the end cover 12 is provided with a smooth section 22.

The braking means 30 comprises a braking ring 31 and a helical spring 32. In the present embodiment, the braking ring 31 has a stepped circular shape and is constituted of three curved plates 311. A slot 312 is formed between any two adjacent curved plates 311. Each curved plate 311 may be made of metallic or plastic materials for frictionally braking the rotation shaft 20. The helical spring 32 surrounds and elastically presses the outer periphery of each curved plate 311. The helical spring 32 is a circular ring having a profile corresponding to the profile of the braking ring 31. Each curved plate 311 is put on the outer periphery of the smooth section 22 of the rotation shaft 20. The helical spring 32 may be a right-hand helical spring. When the rotation shaft 20 rotates counterclockwise, the helical spring 32 and each curved plate 311 generate a radial contraction. On the contrary, when the rotation shaft 20 rotates clockwise, the helical spring 32 and each curved plate 311 generate a radial expansion.

The main body 10 further includes a shroud 41 and a screw element 42. With the screw element 42 penetrating the threaded hole 121, the shroud 41 can be fixed to the end cover 12. The shroud 41 has an outer ring 411 and an inner ring 412 connected to the outer ring 411 and formed inside the outer ring 411. A groove 413 is formed between the outer ring 411 and the inner ring 412. A stopping plate 414 protrudes inwardly from an inner wall surface of the inner ring 412. A portion of the helical spring 32 is received in the groove 413 to be tightly put on the outer periphery of the inner ring 412. The other portion of the helical spring 32 is elastically put on the outer periphery of the large-diameter end of each curved plate 311. In the present embodiment, the stopping means 40 includes the slot 312 formed between any two adjacent curved plates 311 and the stopping plate 414 inserted into the slot 312 for restricting the rotation of any curved plate 311.

Figure 4:
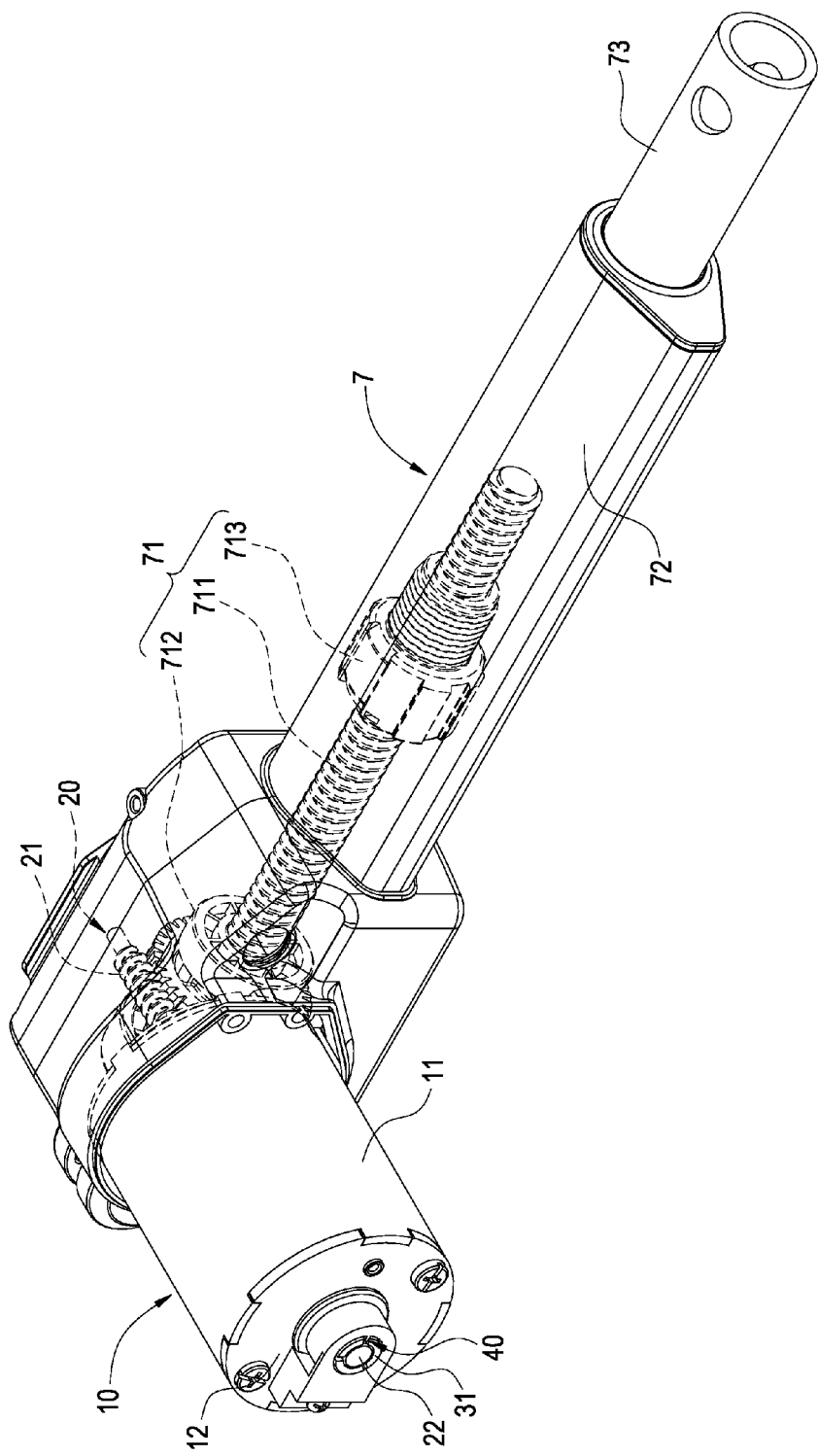
FIG. 4 is a schematic view showing that the first embodiment of the present invention is used in a linear actuator.

Please refer to FIG. 4. The motor 1 of the present invention is mounted in a linear actuator 7. The linear actuator 7 includes a transmission means 71, an outer tube 72, a telescopic tube 73, and other electrical elements or driving elements. The transmission means 71 comprises a lead screw 711, a worm wheel 712, and a nut 713. One end of the outer tube 72 is connected to the main body 10. The lead screw 711 is received inside the outer tube 72. The worm wheel 712 is fixed to the lead screw 711 and rotates together with the lead screw 711. One end of the telescopic tube 73 is fixed to the nut 713, and the other end of the telescopic tube 73 extends outside the outer tube 72. The nut 713 and the lead screw 711 are in transmission connection with each other by means of threaded connection. The motor 1 of the present invention is arranged on one side of the end of the lead screw 711. The worm rod 21 of the rotation shaft 20 is drivingly engaged with the worm wheel 712. By this arrangement, the linear actuator 7 is obtained.

In use, the rotation shaft 20 is driven by the internal elements of the main body 10 to rotate. When the worm wheel 712 is driven by the worm rod 21 to rotate counterclockwise, the lead screw 711 will drive the telescopic tube 73 to retract into the outer tube 72. With one of the curved plates 311 being stopped by the stopping plate 411 and the helical spring 32 tightly constraining the outer periphery of the braking ring 31, the helical spring 32 and each curved plate 311 contract in a radial direction. At this time, the inner wall surface of each curved plate 311 rubs against the surface of the rotation shaft 20, thereby reducing the rotation speed of the rotation shaft 20 and the lead screw 711. In this way, when the linear actuator 7 is mounted in an electric bed or electric chair, the retracting speed of the telescopic tube 73 into the outer tube 72 can be made smaller, so that the user will feel more comfortable when using such an electric bed or chair.

On the contrary, when the worm wheel 712 is driven by the worm rod 21 to rotate clockwise, the lead screw 711 will drive the telescopic tube 73 to extend out of the outer tube 72. Since the rotating direction of the rotation shaft 20 is opposite to that of the winding direction of the helical spring 32, the rotation shaft 20 drives each curved plate 311 and the helical spring 32 to expand in a radial direction. At this time, each curved plate 311 is separately released from the surface of the rotation shaft 20, thereby reducing the frictional force during the rotation of the rotation shaft 20. In this way, the rotation shaft 20 can rotate in the braking ring 31 easily without affecting the transmission performance of the motor 1.

Figure 5:
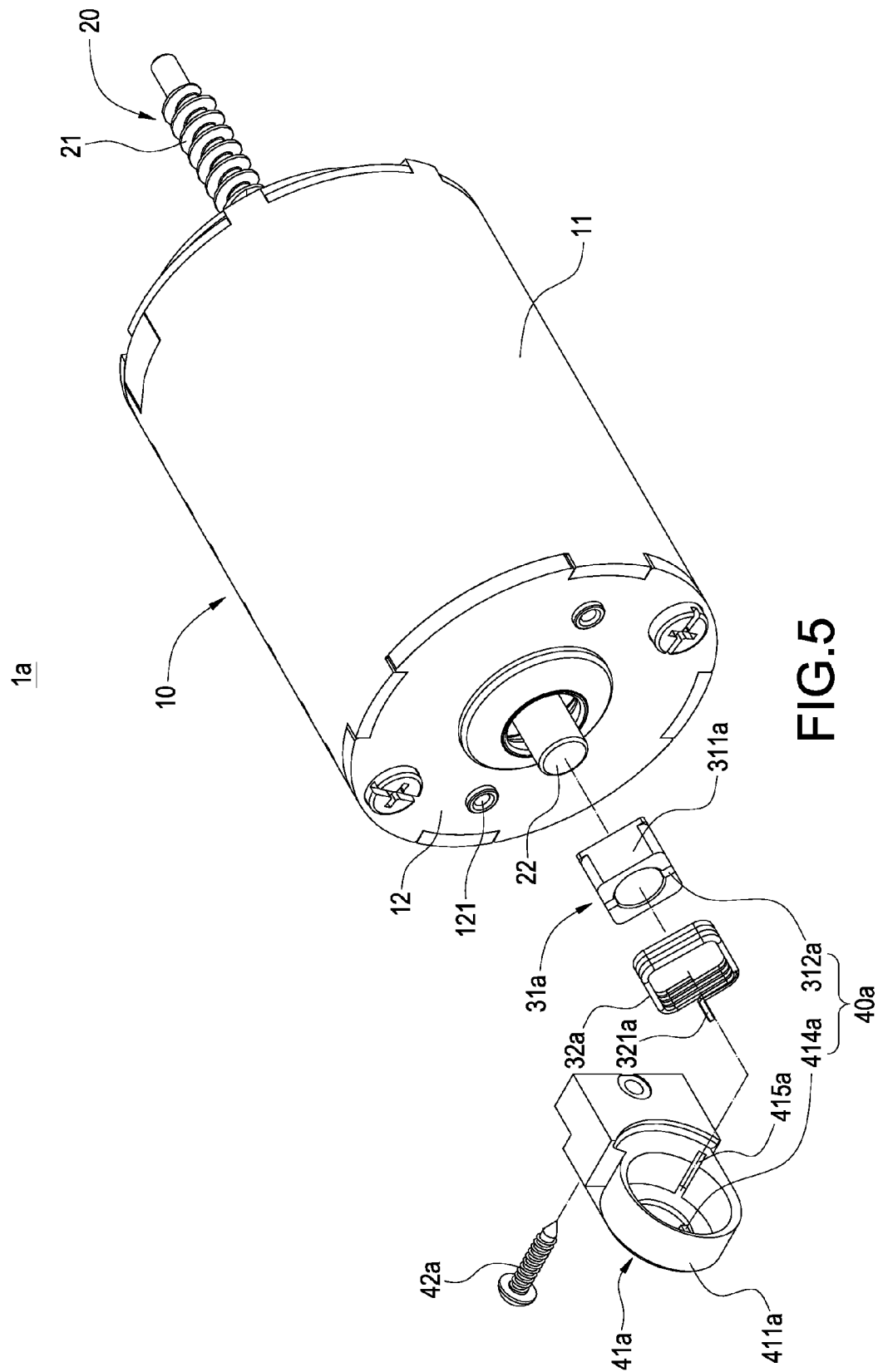
FIG. 5 is an exploded perspective view showing a second embodiment of the present invention.
Figure 6:
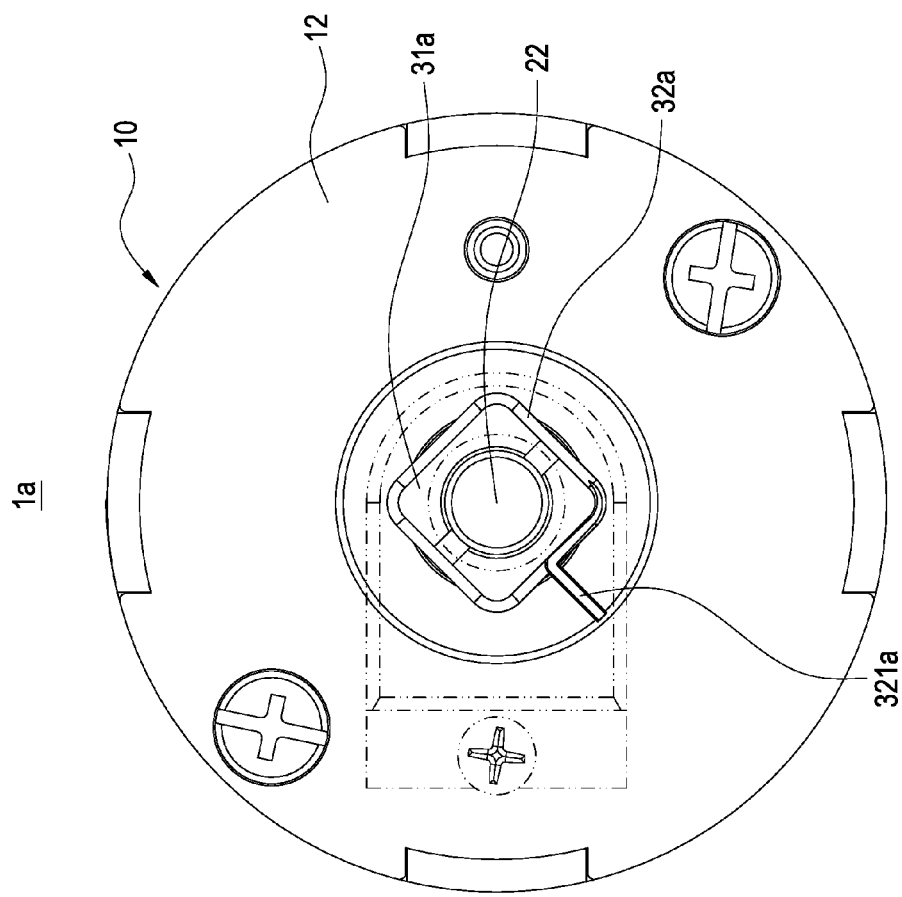
FIG. 6 is an assembled view showing the second embodiment of the present invention.

Please refer to FIGS. 5 and 6, which show the motor according to the second embodiment of the present invention. The difference between the motor 1a of the second embodiment and the motor 1 of the first embodiment lies in that: the braking ring 31a has a rectangular shape and is constituted of two curved plates 311a. A slot 312a is formed between any two adjacent curved plates 311a. The helical spring 32a surrounds and elastically presses the outer periphery of each curved plate 311a. The helical spring 32a is a rectangular ring having an outer profile corresponding to that of the braking ring 31. Each curved plate 311a is put on an outer periphery of the smooth section 22 of the rotation shaft 20. An end of the helical spring 32a extends to form a positioning arm 321a. In the present embodiment, the main body 10 further includes a shroud 41a and a screw element 42a. The shroud 41a has an outer ring 411a. A stopping plate 414a protrudes inwardly from an inner wall surface of the outer ring 411a. A groove 415a is also formed on the inner wall surface of the outer ring 411a. In the present embodiment, the stopping means 40a includes the slot 312a formed between the two curved plates 311a and the stopping plate 414a inserted into the slot 312a for restricting the rotation of any curved plate 311a. The positioning arm 321a of the helical spring 32a is inserted into the groove 415a and positioned therein. With the non-circular shape of the braking ring 31a and one end of the helical spring 32a being fixed, the braking ring 31a and the helical spring 32a cannot rotate relative to each other. In this way, each curved plate 311a can generate a better braking effect to the rotation shaft 20.

Figure 7:
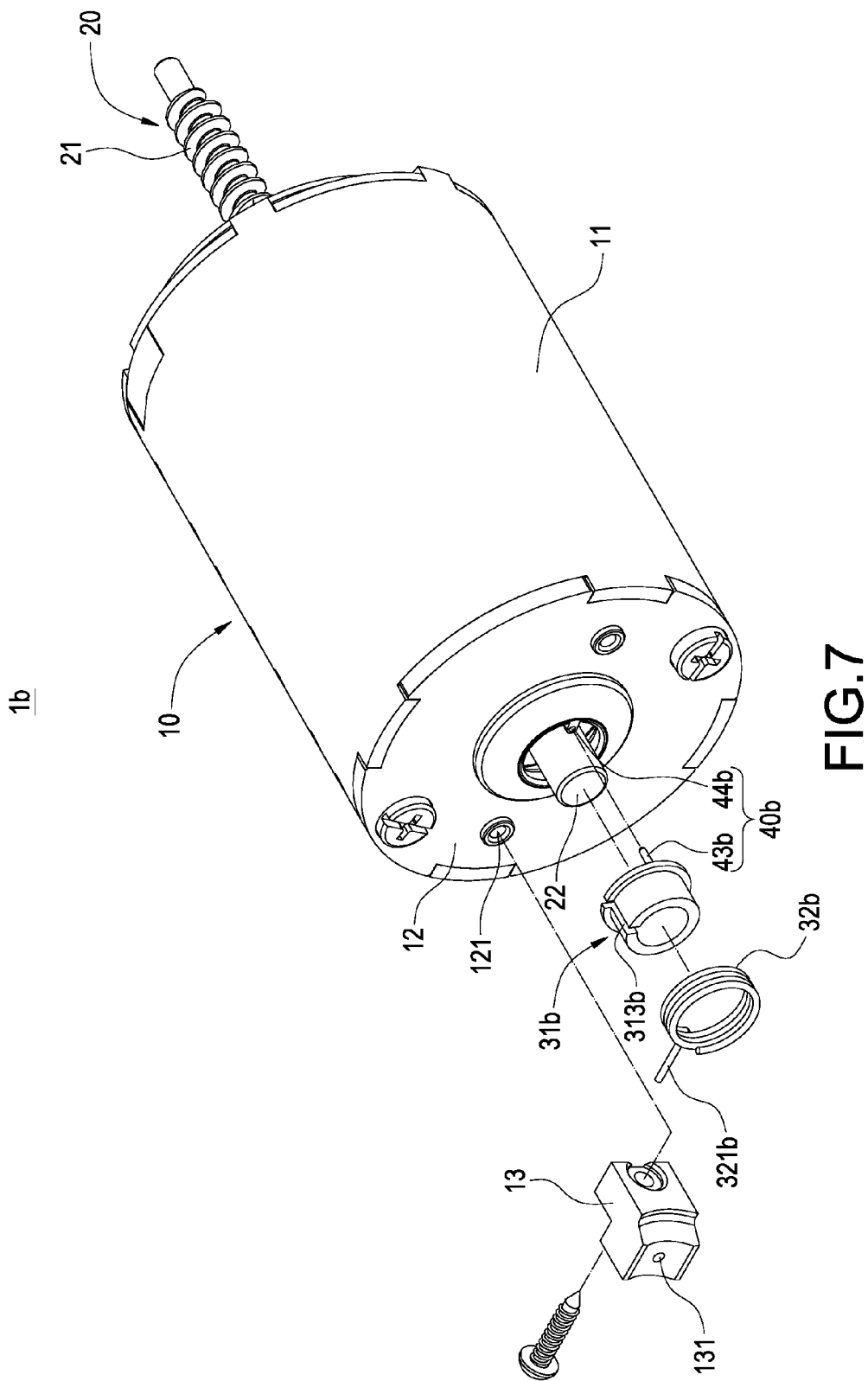
FIG. 7 is an exploded perspective view showing a third embodiment of the present invention.
Figure 8:
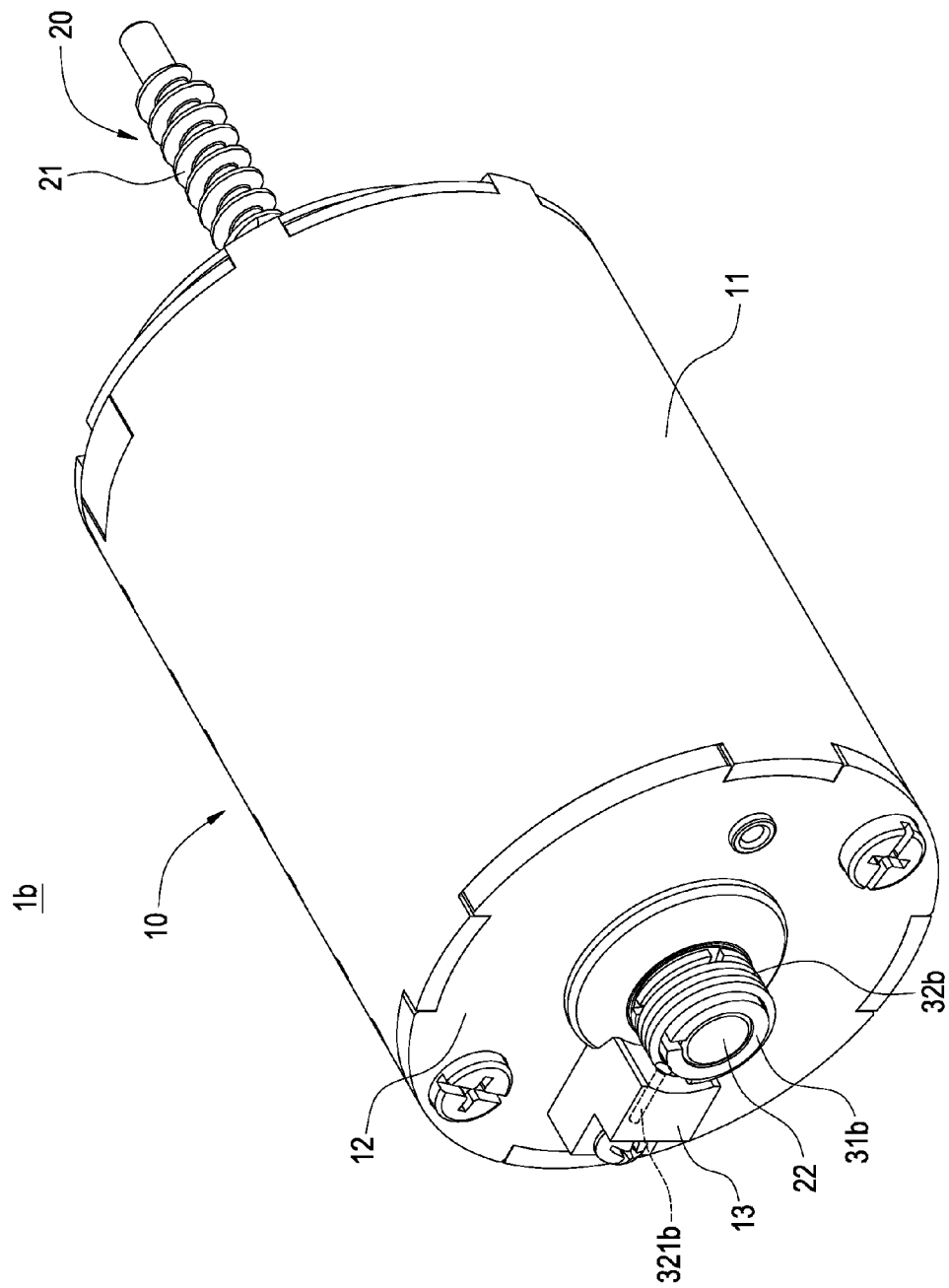
FIG. 8 is an assembled view showing the external appearance of the third embodiment of the present invention.
Figure 9:
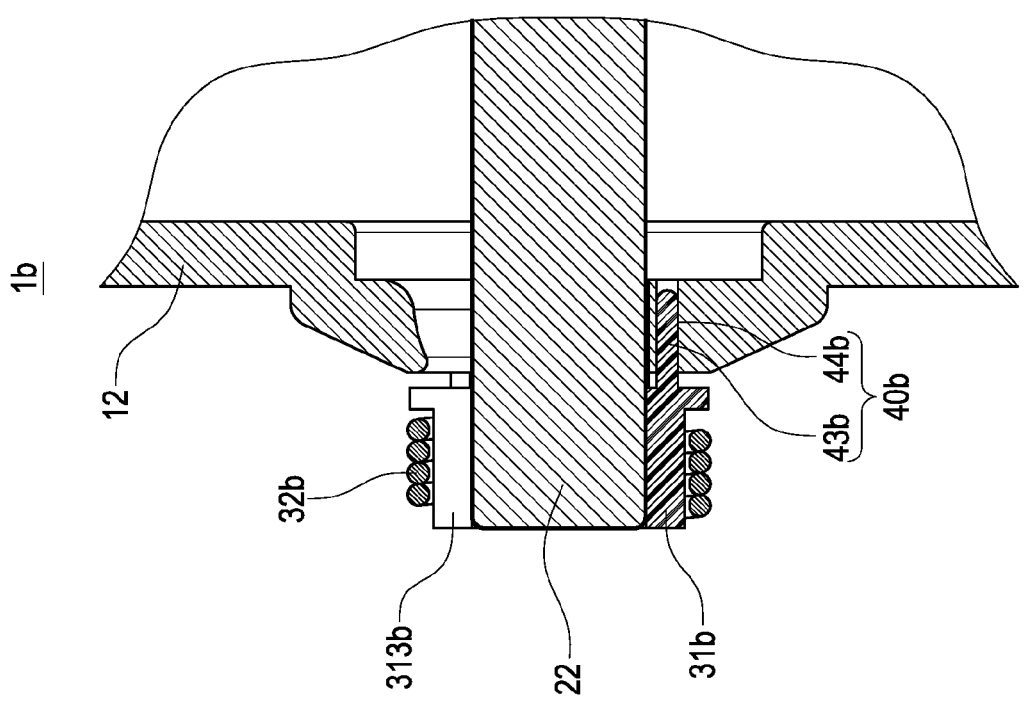
FIG. 9 is a partially cross-sectional view of FIG. 8.

Please refer to FIGS. 7 to 9, which show the motor according to the third embodiment of the present invention. The difference between the motor 1b of the third embodiment and the motors of the previous embodiments lies in that: the braking ring 31b is circular braking ring. The braking ring 31b is provided with a slot 313b in parallel to its central line (or axial line). The helical spring 32b has a circular shape to surround the outer periphery of the braking ring 31b. The braking ring 31b is put on the outer periphery of the smooth section 22 of the rotation shaft 20. An end of the helical spring 32b extends to form a positioning arm 32b. In the present embodiment, the stopping means 40b includes an insertion hole 44b provided on the main body 10 and a pin 43b fixed on an end surface of the braking ring 31b. The pin 43b is inserted into the insertion hole 44b for restricting the rotation of the braking ring 31b. The main body 10 of the third embodiment further comprises a fixing element 13. The fixing element 13 is fixed onto the end cover 12 via a screw element such as a screw. The fixing element 13 is provided with a positioning hole 131 for allowing the positioning arm 321b of the helical spring 32b to penetrate into the positioning hole 131. In addition, the braking ring 31b may be configured as a stepped circular ring like the first embodiment or a rectangular ring like the second embodiment. Similarly, the helical spring 32b has an outer profile corresponding to that of the braking ring 31b.

Figure 10:
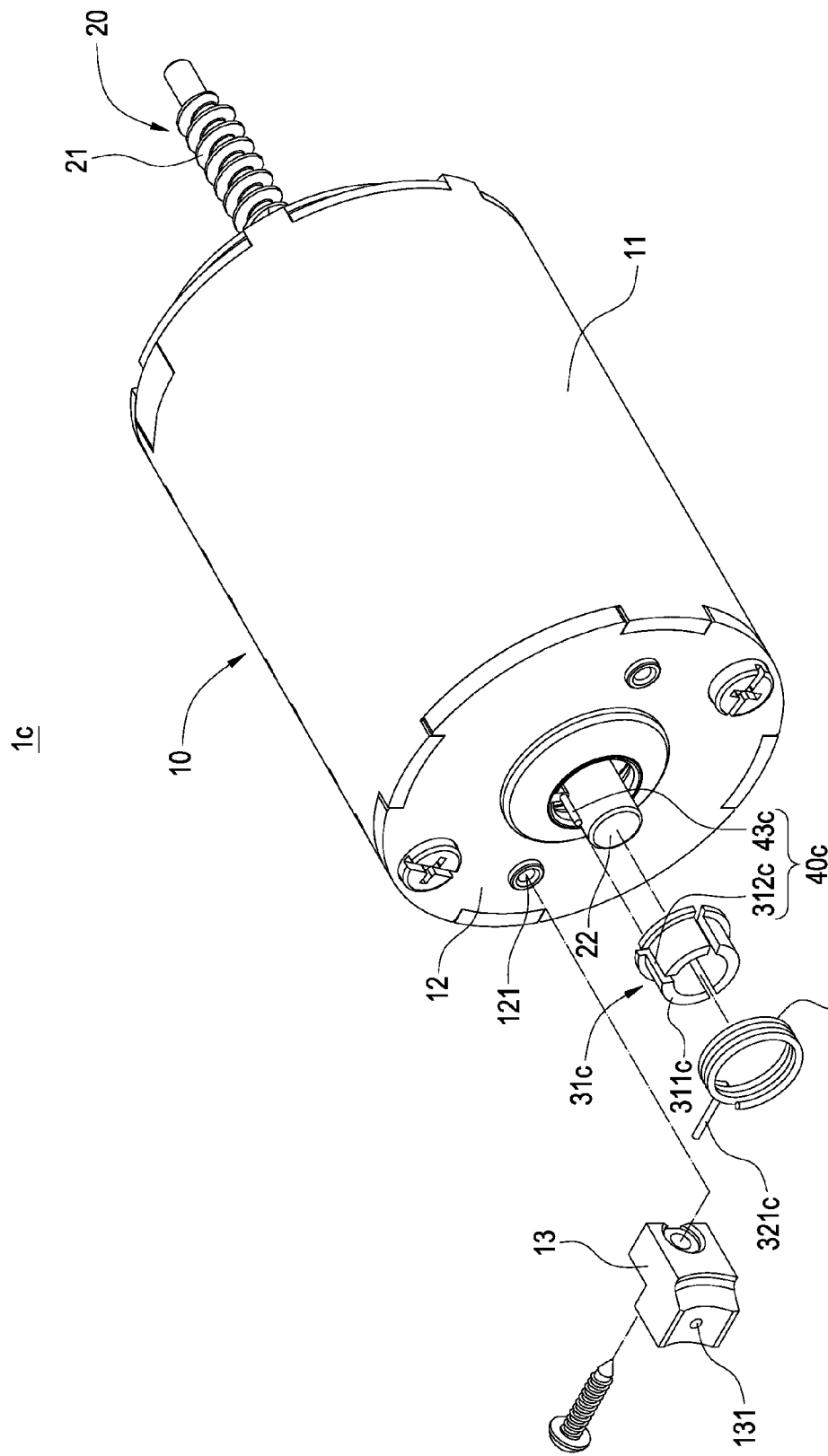
FIG. 10 is an exploded perspective view showing a fourth embodiment of the present invention.
Figure 11:
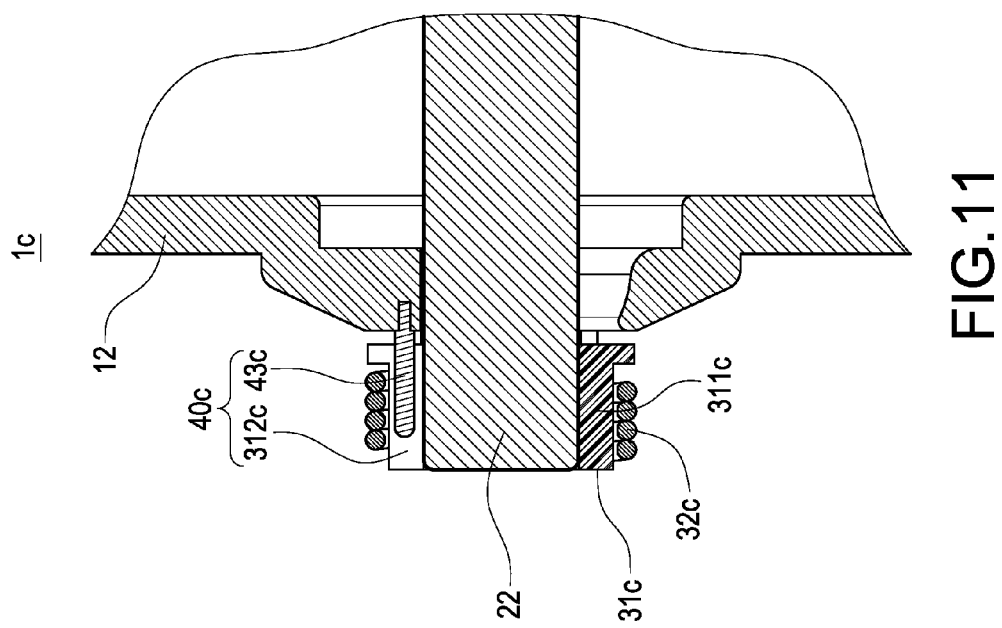
FIG. 11 is a partially cross-sectional view of FIG. 10.

Please refer to FIGS. 10 and 11, which show the motor according to the fourth embodiment of the present invention. The difference between the motor 1c of the fourth embodiment and the motors of the previous embodiments lies in that: the braking ring 31c is a circular ring constituted of three curved plates 311c. In the present embodiment, the stopping means 40c includes a slot 312c formed between any two adjacent curved plates 311c and a pin 43c fixed to the main body 10. The pin 43c is inserted into the slot 312c to restrict the rotation of the braking ring 31c. The helical spring 32c is also formed into a circular shape and surrounds the outer periphery of the braking ring 31c. An end of the helical spring 32c extends to form a positioning arm 321c. The positioning arm 321c of the helical spring 32c is inserted into the positioning hole 131 of the fixing element 13.

Figure 12:
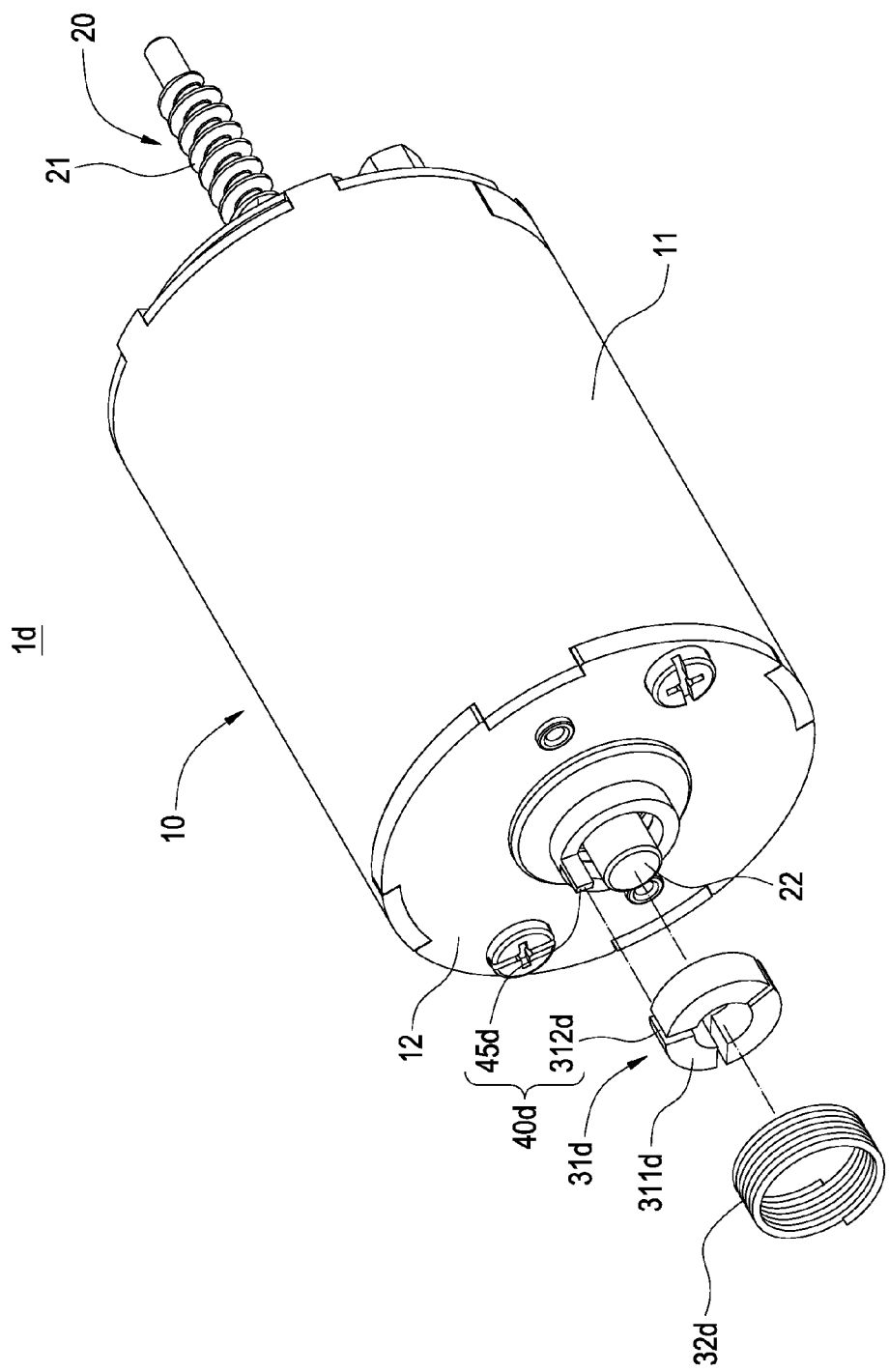
FIG. 12 is an exploded perspective view showing a fifth embodiment of the present invention.

Please refer to FIG. 12, which show the motor according to the fifth embodiment of the present invention. The difference between the motor 1d of the fifth embodiment and the motors of the previous embodiments lies in that: the stopping means 40d of the present embodiment includes a slot 312d formed between any two adjacent curved plates 311d and a stopping block 45d protruding from the end cover 12 of the main body 10. The stopping block 45d is inserted into the slot 312d to restrict the rotation of any braking ring 31d. The helical spring 32d is also formed into a circular shape and surrounds the outer periphery of the braking ring 31d.

Figure 13:
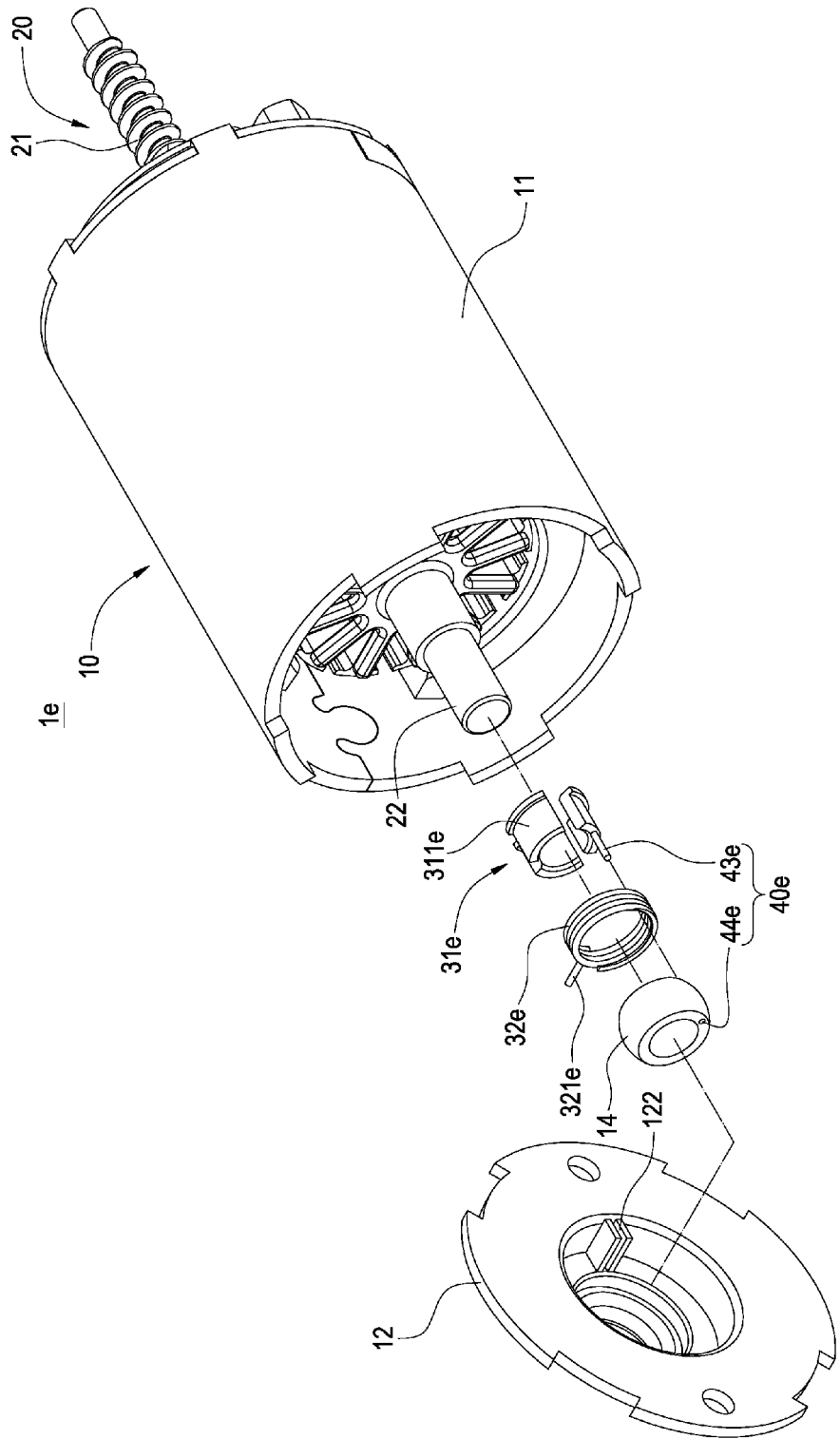
FIG. 13 is an exploded perspective view showing a sixth embodiment of the present invention.
Figure 14:
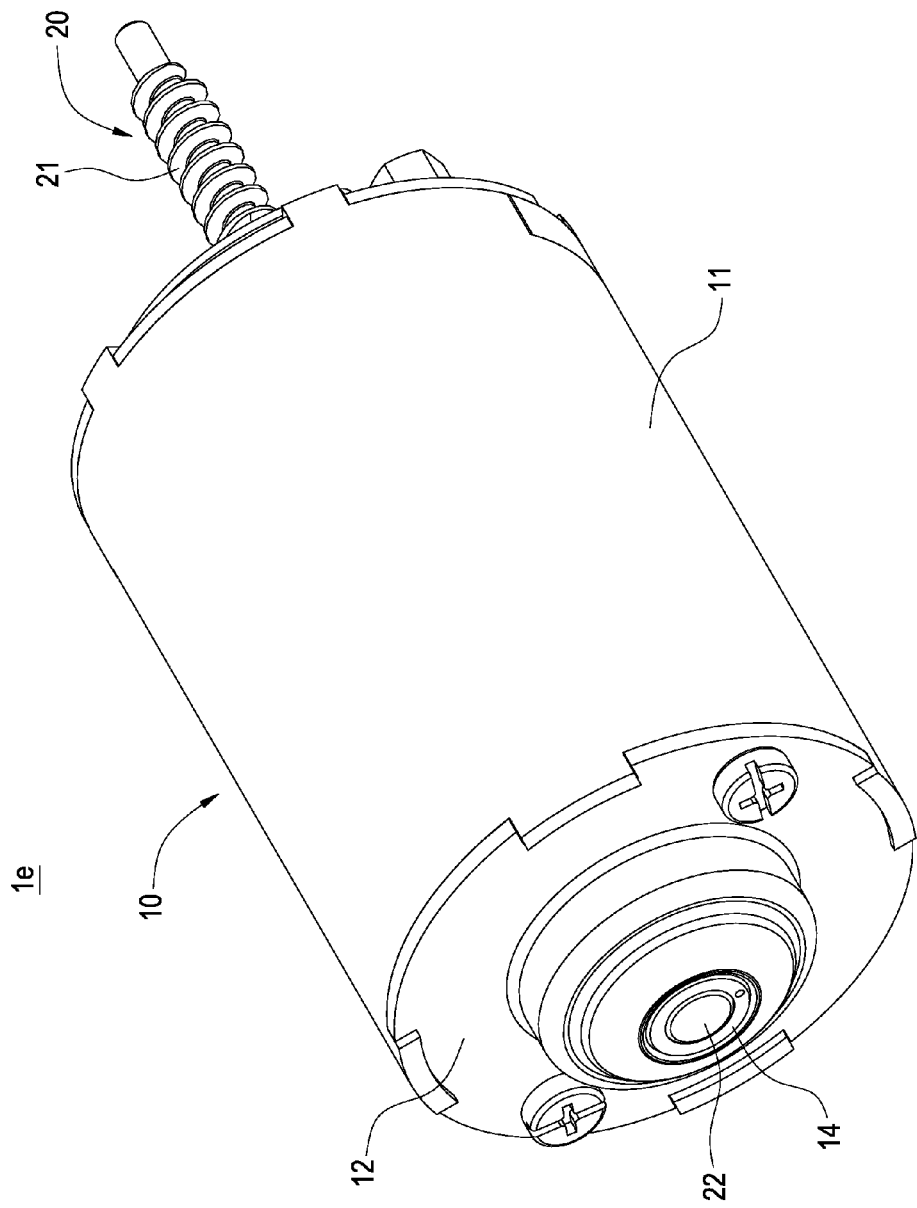
FIG. 14 is an assembled view showing the external appearance of the sixth embodiment of the present invention.
Figure 15:
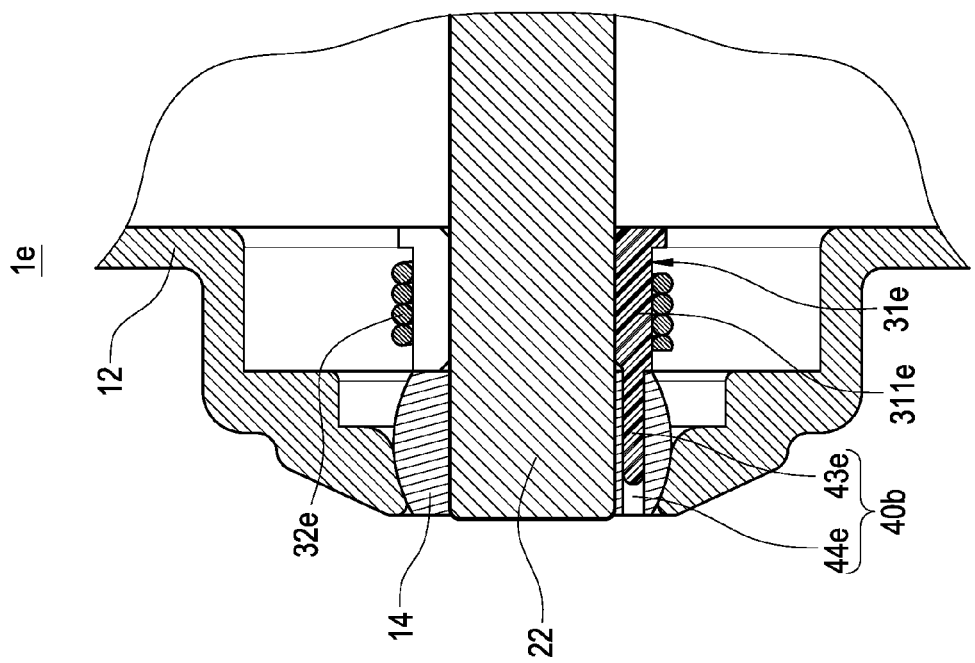
FIG. 15 is a partially cross-sectional view of FIG. 14.

Please refer to FIGS. 13 to 15, which show the motor according to the sixth embodiment of the present invention. The difference between the motor 1e of the sixth embodiment and the motors of the previous embodiments lies in that: the main body 10 further comprises a shaft tube 14. The shaft tube 14 is put on the distal end of the smooth section 22 of the rotation shaft 20 and fixed in the end cover 12. In the present embodiment, the stopping means 40e includes an insertion hole 44e provided in the shaft tube 14 and a pin 43e fixed to an end surface of any curved plate 311e. The pin 43e is inserted into the insertion hole 44e to restrict the rotation of the braking ring 31e. The interior of the end cover 12 is provided with an insertion trough 122. The helical spring 32e is formed into a circular shape to surround the outer periphery of the braking ring 31e. An end of the helical spring 32e extends to form a positioning arm 321e. The positioning arm 321e is inserted into the insertion trough 122 of the end cover 12.

Figure 16:
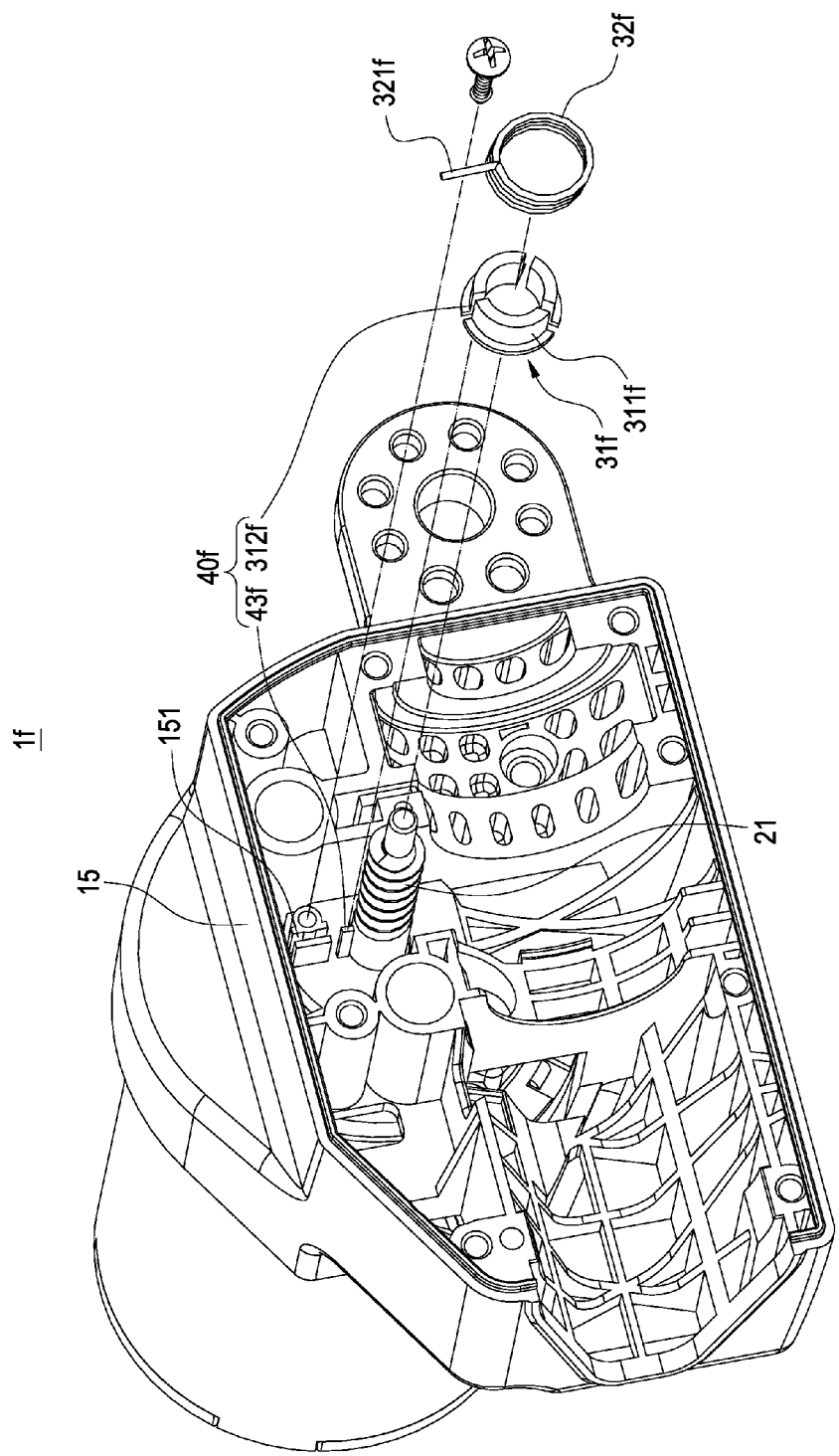
FIG. 16 is an exploded perspective view showing a seventh embodiment of the present invention.
Figure 17:
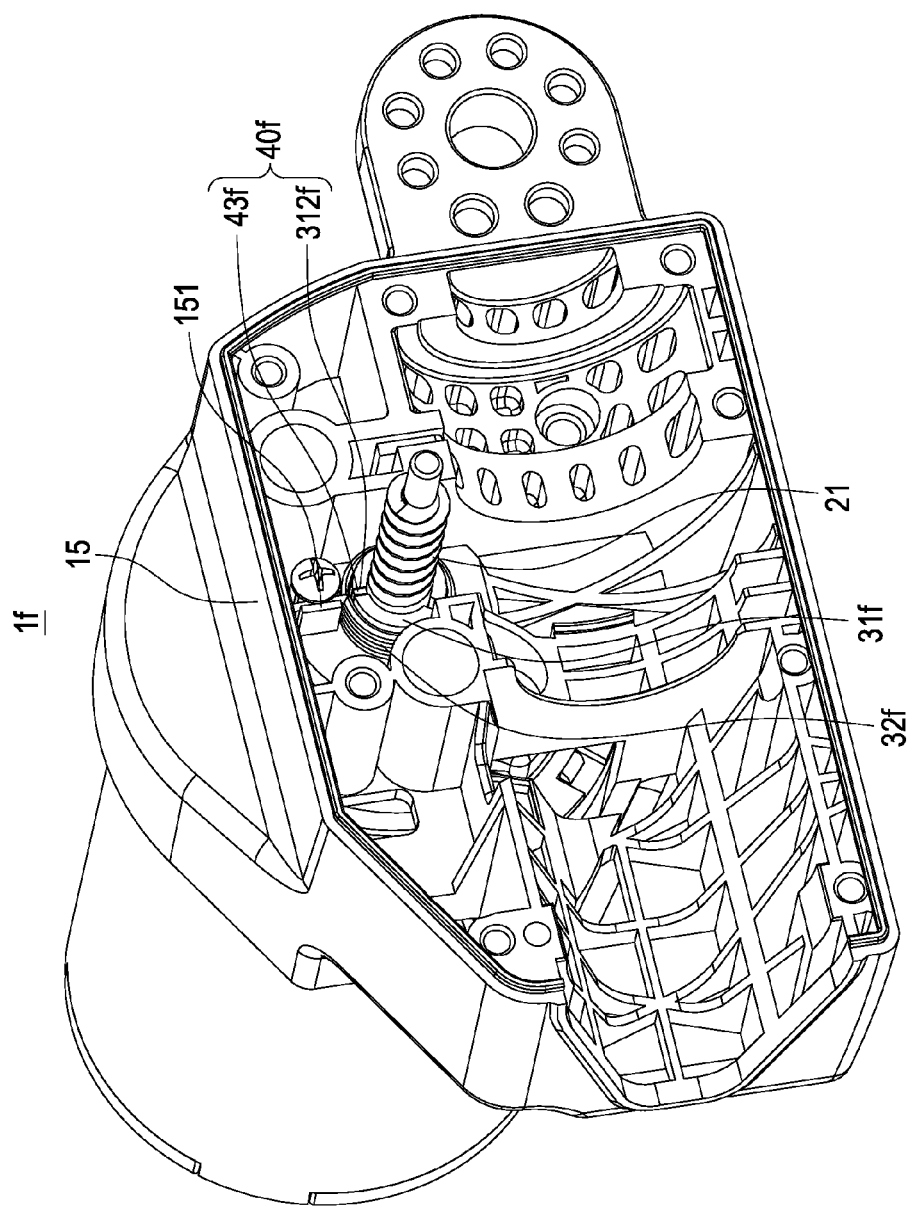
FIG. 17 is an assembled view showing the external appearance of the seventh embodiment of the present invention.

Please refer to FIGS. 16 and 17, which show the motor according to the seventh embodiment of the present invention. The difference between the motor if of the seventh embodiment and the motors of the previous embodiment lies in that: one end of the casing 11 away from the end cover 12 is connected with a base 15. In the present embodiment, the stopping means 40f includes a slot 312f formed between any two adjacent curved plates 311f and a stopping block 43f connected to the base 15. The stopping block 43f is inserted into the slot 312f to restrict the rotation of the braking ring 31f. In addition, the interior of the base 15 is provided with a positioning trough 151. An end of the helical spring 32f extends to form a positioning arm 321f. The positioning arm 321f is inserted into the positioning trough 151 of the base 15.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A motor having a braking function and used in a linear actuator, including:
   a main body;
   a rotation shaft penetrating the center of the main body;
   a braking means comprising a braking ring and a helical ring, the braking ring being constituted of a plurality of curved plates, the helical ring surrounding an outer edge of each curved plate, each curved plate being put on an outer periphery of the rotation shaft; and
   a stopping means disposed between the main body and the braking means for restricting the rotation of any of the curved plates;
   wherein the main body comprises a base, a slot is formed between any two adjacent curved plates, and the stopping means includes the slot and a stopping block connected to the base and inserted into the slot.

2. The motor having a braking function and used in a linear actuator according to claim 1, wherein the main body is provided with a positioning trough, the helical spring extends to form a positioning arm, and the positioning arm is inserted into the positioning trough for positioning.

3. The motor having a braking function and used in a linear actuator according to claim 1, wherein the braking ring is formed into a circular shape, and the helical spring is a circular ring for elastically pressing the braking ring.

4. The motor having a braking function and used in a linear actuator according to claim 1, wherein the braking ring is formed into a stepped circular shape, and the helical spring is a circular ring for elastically pressing the braking ring.

\* \* \* \* \*